United States Patent
Johansson et al.

(10) Patent No.: US 11,331,728 B2
(45) Date of Patent: May 17, 2022

(54) TURNING INSERT

(71) Applicant: SANDVIK INTELLECTUAL PROPERTY AB, Sandviken (SE)

(72) Inventors: Adam Johansson, Sandviken (SE); Ronnie Lof, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 205 days.

(21) Appl. No.: 16/760,189

(22) PCT Filed: Oct. 10, 2018

(86) PCT No.: PCT/EP2018/077545
§ 371 (c)(1),
(2) Date: Apr. 29, 2020

(87) PCT Pub. No.: WO2019/086218
PCT Pub. Date: May 9, 2019

(65) Prior Publication Data
US 2020/0346288 A1 Nov. 5, 2020

(30) Foreign Application Priority Data

Oct. 31, 2017 (EP) .................................... 17199370

(51) Int. Cl.
*B23B 27/16* (2006.01)
*B23B 27/14* (2006.01)

(52) U.S. Cl.
CPC ........ *B23B 27/141* (2013.01); *B23B 27/1622* (2013.01); *B23B 2200/087* (2013.01); *B23B 2200/125* (2013.01); *B23B 2200/201* (2013.01)

(58) Field of Classification Search
CPC ............ B23B 2200/201; B23B 27/141; B23B 2200/087; B23B 2200/125;
(Continued)

(56) References Cited

U.S. PATENT DOCUMENTS 3,621,549 A     11/1971  Billups
4,856,942 A  *   8/1989  Bernadic ............... B23B 27/143
                                                                407/114
(Continued)

FOREIGN PATENT DOCUMENTS

EP      3153261 A1     4/2017
JP    02095508 A  *    4/1990  ............. B23C 5/202
(Continued)

*Primary Examiner* — Sara Addisu
(74) *Attorney, Agent, or Firm* — Corinne R. Gorski (57) ABSTRACT

A turning insert includes a top surface, an opposite bottom surface and a reference plane located parallel to and between the top surface and the bottom surface. A nose portion has a convex nose cutting edge, a first cutting edge and a second cutting edge. The nose cutting edge connects the first and second cutting edges. The first and second cutting edges form a nose angle ($\alpha$) of 71-85° relative to each other. The nose portion includes a third convex cutting edge adjacent to the first cutting edge and a fourth cutting edge adjacent to the third convex cutting edge. The fourth cutting edge forms an angle ($\beta$) of 10-30° relative to a bisector. The distance from at least a portion of the fourth cutting edge to the reference plane increases as the distance from the nose cutting edge increases.

17 Claims, 6 Drawing Sheets

(58) Field of Classification Search
CPC ............ B23B 2220/44; B23B 2222/84; B23B 2222/88; B23B 27/1622; B23B 2200/204; B23B 2200/0447; B23B 2200/0428
See application file for complete search history.

(56) References Cited

U.S. PATENT DOCUMENTS

| | | | | |
|---|---|---|---|---|
| 5,634,745 A * | 6/1997 | Wiman | ................ | B23B 27/141 407/113 |
| 5,921,721 A * | 7/1999 | Hintze | ................ | B23B 27/1622 407/113 |
| 7,234,901 B2 * | 6/2007 | Ishida | ................... | B23B 27/141 407/114 |
| 9,737,935 B2 * | 8/2017 | Lof | ..................... | B23B 27/1651 |
| 2001/0051077 A1 * | 12/2001 | Nagata | ................ | B23C 5/2221 407/35 |
| 2003/0031520 A1 * | 2/2003 | Hintze | ................ | B23B 27/141 407/114 |
| 2004/0146365 A1 * | 7/2004 | Usui | .................... | B23B 27/145 407/113 |
| 2006/0228179 A1 * | 10/2006 | Alm | ..................... | B23B 27/145 407/113 |
| 2008/0219784 A1 * | 9/2008 | Yamazaki | ............. | B23B 27/143 407/114 |
| 2008/0292415 A1 * | 11/2008 | Kuroda | ................ | B23D 35/002 407/61 |
| 2012/0057943 A1 * | 3/2012 | Zastrozynski | .......... | B23C 5/202 407/30 |
| 2016/0297010 A1 * | 10/2016 | Kukino | .................... | B24B 3/34 |
| 2016/0361767 A1 * | 12/2016 | Ikeda | .................... | B23B 27/141 |
| 2017/0209935 A1 * | 7/2017 | Furusawa | ............... | B23B 27/22 |
| 2018/0147637 A1 * | 5/2018 | Gonzui | ................ | B23B 27/141 |
| 2019/0247929 A1 * | 8/2019 | Pecina | ................ | B23B 27/141 |

FOREIGN PATENT DOCUMENTS

| | | | | |
|---|---|---|---|---|
| JP | 2000005903 A * | 1/2000 | .......... | B23B 27/141 |
| WO | 2016190351 A1 | 12/2016 | | |

* cited by examiner

TURNING INSERT

RELATED APPLICATION DATA

This application is a § 371 National Stage Application of PCT International Application No. PCT/EP2018/077545 filed Oct. 10, 2018 claiming priority to EP 17199370.2 filed Oct. 31, 2017.

TECHNICAL FIELD OF THE INVENTION

The present invention belongs to the technical field of metal cutting. More specifically the present invention belongs to the field of turning inserts used for metal cutting in machines such as CNC-machines.

BACKGROUND OF THE INVENTION AND PRIOR ART

The present invention refers to a turning insert according to the preamble of claim 1. In other words, the present invention refers to a turning insert comprising a top surface, an opposite bottom surface, wherein a reference plane is located parallel to and between the top surface and the bottom surface, wherein a center axis extends perpendicular to the reference plane, a side surface connecting the top surface and the bottom surface, a nose portion comprising a convex nose cutting edge, a first cutting edge and a second cutting edge, wherein the nose cutting edge connects the first and second cutting edges, in that in a top view the first and second cutting edges forms a nose angle of 71-85° relative to each other, wherein a bisector extends equidistantly from the first and second cutting edges, in that the nose portion comprises a third convex cutting edge adjacent to the first cutting edge and a fourth cutting edge adjacent to the third convex cutting edge, in that in a top view the fourth cutting edge forms an angle of 10-30° relative to the bisector, in that the third convex cutting edge and the fourth cutting edge is connected by a transition point.

Such a turning insert is disclosed in EP3153261A1. In turning of a metal work piece, the metal work piece rotates around a center axis. The metal work piece is clamped at one end by a chuck or jaws or by other means, which means rotates. The end of the work piece which is clamped can be called a clamping end or a driving end. For stable clamping, the clamping end or the driving end of the metal work piece has a larger diameter than the opposite end of the metal work piece and/or has a larger diameter of a portion of the metal work piece located between the clamping end and the opposite end. Alternatively, the metal work piece has a constant diameter before a machining, i.e. metal cutting, operation. The turning insert is moved in relation to the metal work piece. This relative movement is called feed. The movement of the turning insert can be in a direction parallel to the center axis of the metal work piece, this is commonly called longitudinal feed or axial feed. The movement of turning insert can furthermore be in a direction perpendicular to the center axis of the metal work piece, this is commonly called radial feed or facing. Other angles of movement are also possible, this is commonly known as copying or copy-turning. During the relative movement of the turning insert, material from the metal work piece is removed in the form of chips. The chips are preferably short and/or have a shape or direction of movement which prevents chip jamming and/or do not give a poor surface finish of the machined surface.

The turning insert in EP3153261A1 is intended to overcome drawbacks in machining an external 90° corner in a metal work piece. Said turning insert can be used in axial turning (longitudinal turning), i.e. where the movement of the turning insert is in a direction parallel to the center axis of the metal work piece. Said turning insert give good tool life.

SUMMARY OF THE INVENTION

The inventors have found that under certain cutting conditions the chip control and/or chip breaking can be further improved in longitudinal turning.

Especially, there is a need to improve chip control and/or chip breaking in longitudinal turning at low (<45°) entering angles and at high cutting depth, and/or in roughing operations, e.g. where the surface roughness of the machined surface is not critical. Said need is especially present when the chip-breaking properties of the work piece material is low, such as when the work piece material is e.g. a low carbon (maximum 0.20 wt. % Carbon content) steel (such as S355J2 according to EN 10025-2:2004), Titanium (Titanium alloys having a Titanium content of at least 80 wt. %) or a Nickel-based (at least 40 wt. % Nickel content) heat resistant super alloy (in particular alloys having Chromium as the second element, in particular Inconel alloys, such as Inconel 718). There is further a need to obtain good chip breaking and/or chip control as well as good surface finish at low cutting depths in longitudinal turning at low (<45°) entering angles.

An object of the present invention is to provide an improvement in at least some of the above described aspects. This is achieved by a the above described turning insert where a distance from at least a portion of the fourth cutting edge to the reference plane is increasing at increasing distance from the nose cutting edge.

By such an insert, the inventors have found that the insert wear is low because the turning insert can be used at low (<45°) entering angles in longitudinal turning. The relatively large nose angle gives reduced insert wear at the nose cutting edge. The nose angle is sufficiently small, less or equal than 85°, so that a 90° corner can be machined.

The inventors have found that for longitudinal turning, i.e. axial turning, certain groups of metals have a tendency for directing chips in the same direction as the feed direction, when using low entering angles which are less than 45°, and especially within the range of 3-35°. Under such conditions, the inventors have found that chip breaking is poor. The inventors have found that by using the above described turning insert under such conditions, chip breaking is surprisingly significantly improved, especially at cutting depts of at least 1 mm.

By such an insert, chip breaking and/or chip control is improved when in axial feeding, i.e. longitudinal turning, at high cutting depth and/or in roughing operations where the surface roughness of the machined surface is not critical. The inventors have found that by such a turning insert, chips have a high tendency to form clock-spring shapes and break, also for e.g. low carbon steels and other materials which have poor chip breaking tendencies. The inventors have found that in a roughing operation, which is followed be a finishing pass, the chips may alternatively although not preferably be broken by contact with the machined surface. Although this lead to a decrease in surface finish, it is of little or no importance if the surface is machined in a further finishing pass. The same is true if the surface finish requirements of the machined surface is less strict. The inventors have found that at higher cutting depts, where the fourth cutting edge is active at an entering angle of 15-35°, preferably 20-30°, the chip breaking is significantly improved by arranging the fourth cutting edge such that a distance from at least a portion of the fourth cutting edge to the reference plane is increasing at increasing distance from the nose cutting edge. The improvement have been found to be especially significant when the machined metal work piece is one which has low chip-breaking properties, such as the metals described above.

The fourth cutting edge is arranged to be the main cutting edge, i.e. removing the majority of the metal work piece material, when axial turning away. In such operation, the forth cutting edge is arranged such that it forms an entering angle of 20-40°. That the distance from the forth cutting edge to the reference plane is decreasing at increasing distance from the nose cutting edge gives the further effect of improving the chip control even further.

The top surface comprises a rake face. The bottom surface comprises a seating surface. In other words, at least a portion of the bottom surface is arranged to be in contact with a seating surface of a tool body or a shim located in a seat of a tool body. The reference plane is mid-way between the top and bottom surfaces in such a way that the distance from the reference plane to the top surface and bottom surface is equal or substantially equal.

The top and bottom surfaces may be identical or shaped in a corresponding manner. In other words, the turning insert may be symmetrical in relation to the reference plane. By such turning insert, the use of the turning insert may be increased.

Preferably, the bottom surface area is smaller than the top surface area, where said areas are projected onto the reference plane. By such turning insert, which is a positive turning insert, the accessability is improved and the cutting forces may be reduced.

The bottom surface may be flat and parallel to the reference plane. The bottom surface may comprise one or more insert locking means, e.g. in the form of one or more grooves or ridges.

The center axis passes through a geometrical center of the insert. Preferably the center axis coincides with a center axis of a through hole having openings in the top and bottom surfaces. The reference plane is perpendicular to said center axis. The nose cutting edge form the most distal portions of the turning insert, in other words, the nose cutting edge is the part of the cutting insert which are located at the greatest distance from the center axis. A nose portion is a peripheral portion of the cutting insert where a rake face is formed on the top surface between the first, second and nose cutting edges. The nose cutting edge has the shape of an circular arc or a portion of a circle having its center between the first and second cutting edge, wherein the circle preferably has a radius of 0.2-2.0 mm. In other words, the nose cutting edge is preferably a convex cutting edge having a radius of curvature of 0.2-2.0 mm. The nose angel of 71-85° give the advantage that a 90° corner, i.e. two wall surfaces being perpendicular to each other, can be machined with one nose portion of the turning insert, without any reorientation of the turning insert. Alternatively, a nose angle of 71-85° is equal to a nose cutting edge having the shape of a circular arc of an angle of 71-85°. The nose cutting edge may have a shape that deviates slightly from a perfect circular arc. A top view is a view in which the top surface is facing the viewer and the bottom surface is facing away from the viewer. The first and second cutting edges are preferably straight in a top view. If the first and second cutting edges are not straight, e.g. slightly convex, slightly concave or sawtooth shaped, the angles are measured using straight lines between the end points of the first and second cutting edges respectively. The first and second cutting edges preferably have a length of 0.5-20.0 mm, even more preferably 1.0-3.0 mm. At least a portion of, preferably more than 50%, even more preferably more than 90% of the fourth cutting edge is sloping away from the bottom surface and the reference plane away from the nose cutting edge in a side view. The fourth cutting edge preferably forms an angle in relation to the reference plane which is in the range of 1-5°.

Preferably, the turning insert comprises a second nose portion comprising a further nose cutting edge. In such case, all nose cutting edges are preferably located in a common plane parallel to the reference plane.

A cutting edge is an edge of the turning insert which borders to a rake face and a clearance surface.

The turning insert is made from or comprises a wear resistant material such as preferably cemented carbide.

According to an embodiment, the distance from at least a portion of the third convex cutting edge to the reference plane is decreasing at increasing distance from the nose cutting edge.

By such a turning insert, the chip control is further improved, especially at low cutting depths. Preferably, the third cutting edge forms an angle of 1-6° relative to the reference plane.

By such a turning insert, the width of the chip is reduced.

According to an embodiment, the lowest point of the third and fourth cutting edges is the transition point, or a point within 1.00 mm, preferably within 0.5 mm from the transition point.

Preferably, a distance from the reference plane to lowest point of the third and fourth cutting edges is shorter than, preferably 0.1-0.2 mm shorter than a distance from the reference plane to the nose cutting edge.

In other words, in a side view each of the third and fourth cutting edges slope upwards from the transition point, or from a point in the vicinity of, i.e. within 1.00 mm from the transition point.

By such a turning insert, the chip breaking is further improved.

According to an embodiment, the top surface comprises a protrusion, in that the protrusion comprises a chip breaker wall facing the forth cutting edge, in that the chip breaker wall is arranged between an upper border line and a lower border line.

By such a turning insert, the chip breaking is further improved.

The protrusion extends further away from the reference plane than surrounding portions of the top surface. The protrusion preferably has an extension along the bisector. The protrusion is spaced apart from the nose cutting edge, the first cutting edge, the second cutting edge, the third cutting edge and the fourth cutting edge.

Preferably, the turning insert comprises a positive rake angle, which preferably is within the range of 8-20°. In other words, preferably the top surface is sloping downwards, i.e. towards the reference plane, from the cutting edges towards the lower border line. By such a turning insert, chip breaking is further improved. By such a turning insert, cutting forces are decreased.

Preferably, in a top view a distance between the lower border line and the fourth cutting edge is constant or substantially constant. Said distance is preferably within the range of 0.5-1.5 mm.

According to an embodiment, a distance between the upper and lower border lines is decreasing away from the nose cutting edge, in that said distance is measured in a top view perpendicular to the fourth cutting edge.

According to an embodiment, a distance between the upper border line and the forth cutting edge is decreasing away from the nose cutting edge, in that said distance is measured in a plane perpendicular to the reference plane and perpendicular to the fourth cutting edge.

By such a turning insert, the chip breaking is further improved.

Said distance preferably decreases from a maximum value of 0.3-0.5 mm to a minimum value of 0.0-0.1 mm.

According to an embodiment, the distance from the first cutting edge to the reference plane is decreasing at increasing distance from the nose cutting edge.

By such a turning insert, the chip control is further improved, especially at low depths of cut when axial turning such that the first cutting edge is active.

The distance from the first cutting edge to the reference plane is decreasing at increasing distance from the nose cutting edge, i.e. the distance from different points of the first cutting edge to the reference plane varies in such a way that that this distance is decreasing at increasing distance from the nose cutting edge. In other words, the first cutting edge slopes towards the reference plane in a side view. In other words, the nose cutting edge is located at a greater distance from the reference plane than at least a majority of the first cutting edge.

Preferably, the first cutting edge forms an angle of 1-6° relative to the reference plane.

According to an embodiment, the turning insert comprises a second nose portion, and in that in a top view the turning insert is 120° or 180° symmetrical or substantially 120° or 180° symmetrical.

The turning insert is 120° or 180° symmetrical, in other words, if the turning insert is rotated 120° or 180° around the center axis A1, the turning insert is identical. In other words, the at least two opposite nose portions are identical.

According to an embodiment, the nose portion is symmetrical or substantially symmetrical in relation to the bisector.

Each nose portion is thus symmetrical in relation to the bisector, i.e. each nose portion has a shape which is mirrored in a plane perpendicular to the reference plane and comprising the bisector. In other words, the half of the nose portion which is located on one side of the bisector is a mirror shape of the other half of the nose portion located on the opposite side of the bisector. The symmetry in this meaning is the shape and extension of the cutting edges and topography, e.g. chip breaker formation, of the top surface.

According to an embodiment, in a top view the first, second and fourth cutting edges are linear or straight or substantially linear or straight.

By such a turning insert, the cutting force direction and/or chip flow direction will be less dependent of the cutting depth, i.e. depth of cut.

In this context, a concave or convex radius of curvature greater than 200 mm is considered straight or linear. If any of the first, second and fourth cutting edges have a radius of curvature greater than 200 mm, this radius of curvature is substantially greater, or more than 10 times greater, than the radius of curvature of the third cutting edge.

The fourth cutting edge preferably has a length in a top view which is 4-25 mm, even more preferably 6-10 mm. The length of the fourth cutting edge in a top view is greater, preferably 3-7 times greater, even more preferably 4-5 times greater, than the length of the first cutting edge.

In a top view, the turning insert, measured along a line perpendicular to the bisector and intersecting the center axis, has a width of 8-20 mm, more preferably 9-13 mm.

According to an embodiment, in a top view the radius of curvature of the third cutting edge is greater than the radius of curvature of the nose cutting edge.

By such a turning insert, the insert wear is reduced, especially the wear at the third cutting edge.

According to an embodiment, a turning tool comprises the turning insert and a tool body, the tool body comprising a front end, an opposite rear end, a main extension along a longitudinal axis extending from the front end to the rear end, an insert seat formed in the front end in which the turning insert is mountable such that in a top view the distance from the forth cutting edge of an active nose portion to the longitudinal axis of the tool body is shorter than the distance from the second cutting edge of an active nose portion to the longitudinal axis of the tool body, in that the bisector of the active nose portion forms an angle of 40-50° relative to the longitudinal axis A2.

By such a turning tool, the performance is further improved when the turning tool is moving in a direction perpendicular to the longitudinal axis of the tool body and parallel to the rotational axis of the metal work, when the depth of cut is sufficiently great such that the fourth cutting edge is active. If the entering is less than 10°, the width of the chips would be too wide resulting in poor chip control, and the risk of vibration would increase. Also, less depth of cut is possible. If the entering angle is over 45°, the insert wear would increase.

The active nose portion, i.e. the nose portion which is in an active position, is the nose portion which in a mounted state comprises the nose cutting edge which in a top view is the part of the turning insert which is most distal in relation to the rear end of the tool body and in relation to the longitudinal axis of the tool body. The angle which the first cutting edge of the active nose portion forms in relation to the longitudinal axis of the tool body is greater than the angle which the second cutting edge of the active nose portion forms in relation to the longitudinal axis of the tool body. The angle which the fourth cutting edge of the active nose portion forms in relation to the longitudinal axis of the tool body is greater than the angle which the second cutting edge of the active nose portion forms in relation to the longitudinal axis of the tool body. The center axis of the turning insert in a mounted state is perpendicular or substantially perpendicular, or within +/−20° from being perpendicular, in relation to the longitudinal axis of the tool body. The insert seat of the tool body is open cavity or a cut-out in which a turning insert is mountable. Example of means for mounting the insert includes a screw and a top-clamp. The rear end of the tool body is the part of the tool body that is located at a greatest distance from the active nose cutting edge. The rear end of the tool body is mounted to or connected to a machine tool, such as a turning lathe, preferably a computer numerical control (CNC) lathe.

According to an embodiment, a method to generate a cylindrical surface on a metal work piece with a turning tool, comprises the steps of rotating the metal work piece around a rotational axis, positioning the first cutting edge of an active nose portion such that the first cutting edge forms a smaller angle relative to the rotational axis of the metal work piece than the angle formed by the second cutting edge relative to the rotational axis of the metal work piece, positioning the longitudinal axis of the tool body perpendicular to the rotational axis of the metal work piece, and moving the turning insert in a direction parallel to the rotational axis such that the first cutting edge is active and is ahead of the surface generating nose cutting edge in the direction of movement of the turning insert, such that the fourth cutting edge is active at a entering angle of 10-45°, such that the lowest point of the third and fourth cutting edges is active, and such that a cylindrical surface is formed.

In other words, the forth cutting edge forms an entering angle of 10-45°, even more preferably 20-30°, when the turning tool is moving in a direction perpendicular to the longitudinal axis A2 of the tool body.

A cylindrical surface is a surface which has an extension along the rotational axis of the metal work piece and is located at a constant distance from the rotational axis of the metal work piece. Constant distance means a wavy surface where the wave height is less than 0.10 mm. An active nose portion is the nose portion which is positioned such that during cutting, the nose portion comprises at least one cutting edge which cuts chips from the metal work piece. The active nose portion is positioned closer to the rotational axis of the metal work piece and closer to the first end of the metal work piece than any other nose portion, in the case the turning insert comprises more than one nose portion. The fourth cutting edge is active means that the fourth cutting edge cuts chips from the metal work piece. The first cutting edge is active. Further, a portion of the nose cutting edge adjacent to the active first cutting edge is active. The second cutting edge, formed on the same nose portion as the first cutting edge, is inactive simultaneously as the first cutting edge is active. The moving of the turning insert is commonly known as feeding, in this case axial feed. The axial feed is preferably in a direction away from an end of the work piece which is clamped by clamping means, such as e.g. a chuck or jaws.

The method preferably further comprises the step of setting the feed rate to above 0.3 mm/rev., preferably below 1.3 mm/rev., even more preferably within the range of 0.55-1.2 mm/rev. The method preferably further comprises the step of setting cutting depth to at least 0.4 mm, preferably less than 5.0 mm, even more preferably within the range of 0.5-4.0 mm. The method preferably further comprises the step of setting the cutting speed to within the range of 30-1000 m/min, preferably within the range of 40-800 m/min.

Preferably, the method comprises the further step of arranging the first cutting edge such that it forms an entering angle of 2.5-7.5°, even more preferably 4-6°.

Preferably, the method comprises the further step of setting the radial distance between the cylindrical surface and the transition point is within the range of 0.4-2.0 mm, even more preferably 0.4-1.0 mm.

According to an embodiment, the method further comprising the step of positioning the nose cutting edge a greater distance from the longitudinal axis of the tool body than all other parts of the turning tool.

By such a method, a prior or subsequent machining step can be in the form of out-facing, such that the second cutting edge is active.

According to an embodiment, the method further comprising the step of selecting the work piece material from either of the following groups: a) steel having a Carbon content of maximum 0.20 wt. %, b) Titanium including Titanium alloys having a Titanium content of at least 80 wt. %, or c) heat resistant super alloy having a Nickel content of at least 40 wt. %.

By such a method, the improvement in chip breaking is especially significant.

According to an embodiment, the method further comprising the steps of providing a computerized numerical control lathe, and in that the movement of the tool body and the rotation of the metal work piece is controlled by the computerized numerical control lathe.

According to an embodiment, a computer program having instructions which when executed by a computer numerical control lathe cause the computer numerical control lathe to perform the above described method.

The computer program may be stored on a computer readable medium. Alternatively, a data stream may be representative of the computer program.

DESCRIPTION OF THE DRAWINGS

The present invention will now be explained in more detail by a description of different embodiments of the invention and by reference to the accompanying drawings.

DETAILED DESCRIPTION OF EMBODIMENTS OF THE INVENTION

Attention is now drawn to FIGS. 1-5 and 7, which show a turning insert 1 according to a first embodiment. The turning insert 1 comprises a top surface 8 and an opposite bottom surface 9, where a reference plane RP is located parallel to and between the top surface 8 and the bottom surface 9. The top surface 8 is or comprises a rake face. The bottom surface 9 functioning as a seating surface. A center axis A1 extends perpendicular to the reference plane RP. A screw hole having openings in the top surface 8 and the bottom surface 9 is concentric with the center axis A1.

Figure 1:
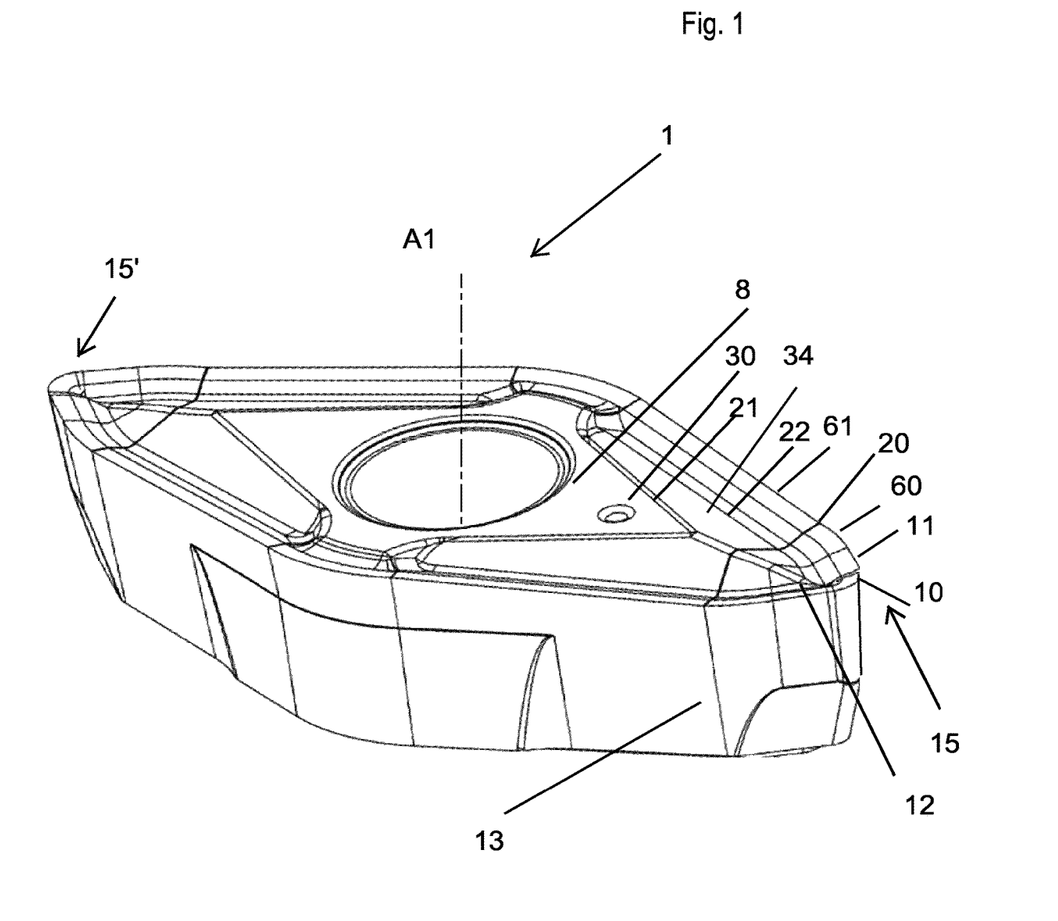
FIG. 1 is a perspective view showing a turning insert according to a first embodiment.
Figure 2:
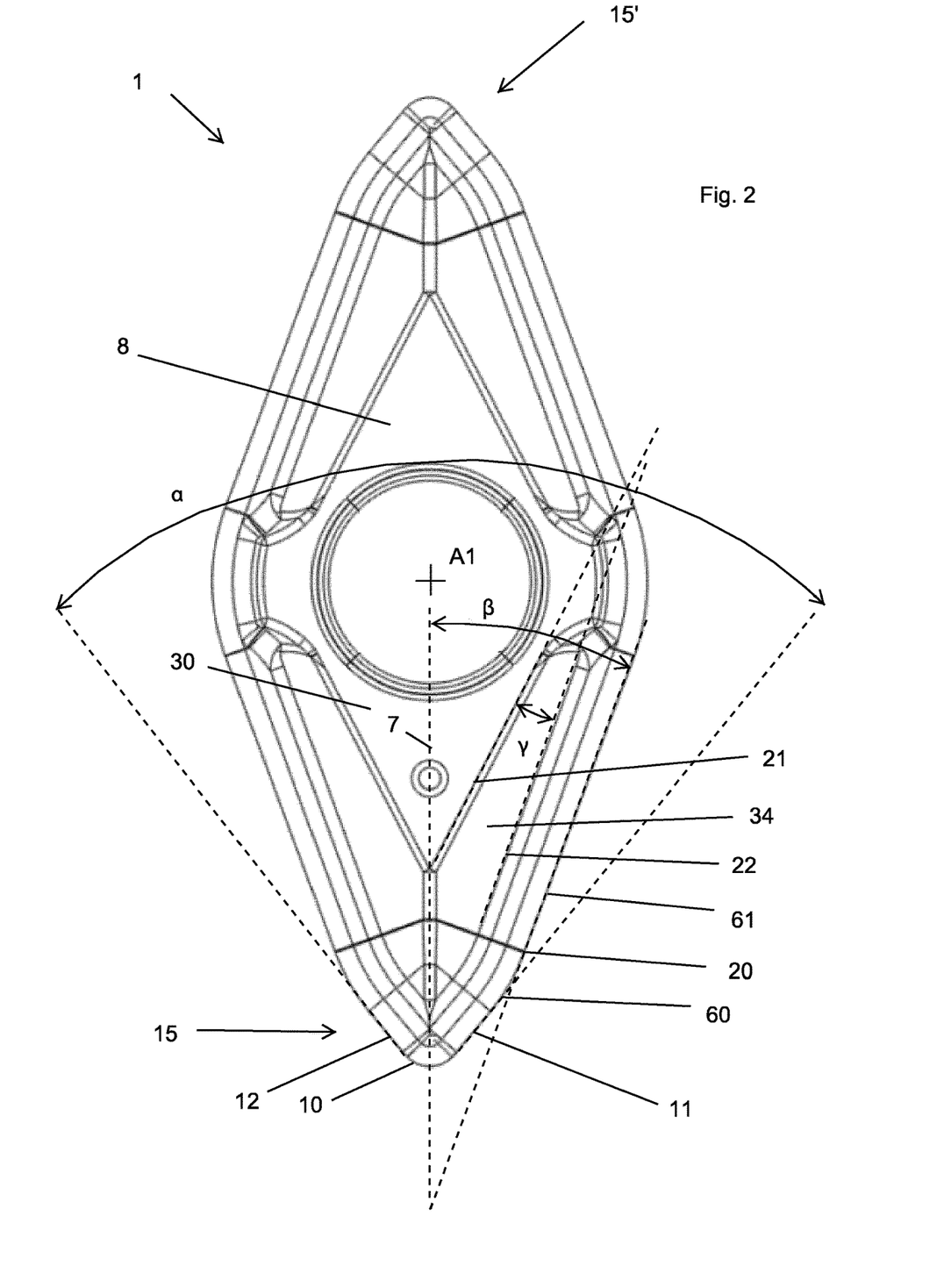
FIG. 2 is a top view of the turning insert in FIG. 1.
Figures 3, 4:
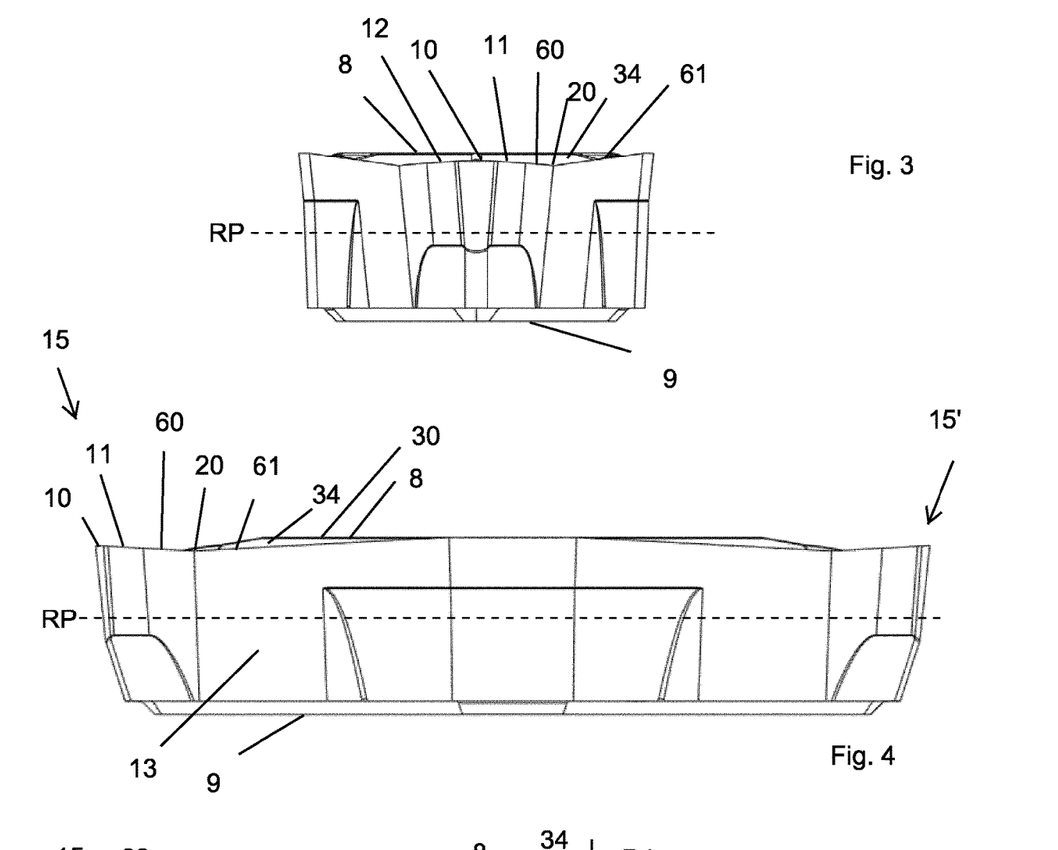
FIG. 3 is a front view of the turning insert in FIG. 1.
FIG. 4 is a side view of the turning insert in FIG. 1, perpendicular to the view shown in FIG. 3.

A side surface 13 connects the top surface 8 and the bottom surface 9. A nose portion 15 comprises a convex nose cutting edge 10, a first cutting edge 11 and a second cutting edge 12. The nose cutting edge 10 connects the first 11 and second 12 cutting edges. In a top view, as seen in FIG. 2, the first 11 and second 12 cutting edges on the same nose portion 15 forms a nose angle α of 71-85° relative to each other, which nose angle α in FIG. 2 is 80°.

In a top view, the nose cutting edge 10, which is part of the nose portion, is located at a largest distance from the center axis A1, i.e. at a larger distance from the center axis A1 than all other parts of the turning insert, except for the nose cutting edge which is part of a second nose portion 15'.

In a top view, imaginary lines coinciding with the first and second cutting edges 11, 12, respectively, converge at a point outside the turning insert 1. A bisector 7 extends equidistantly from the first 11 and second 12 cutting edges. The bisector 7 intersects the center of the nose cutting edge 10 and the center axis A1 of the turning insert 1.

The nose portion 15 comprises a third convex cutting edge 60 adjacent to the first cutting edge 11 and a fourth cutting edge 61 adjacent to the third convex cutting edge 60. In a top view, as in FIG. 2, the fourth cutting edge 61 forms an angle β of 10-30° relative to the bisector 7. The third convex cutting edge 60 and the fourth cutting edge 61 is connected by a transition point 20.

The turning insert 1 according to the first embodiment is single sided turning insert, or a positive turning insert. The side surface 13 comprises clearance surfaces which are tapered inward from the top surface 8 to the bottom surface 9. The advantages from the clearance surface arrangement is that out-facing can be performed at small metal work piece diameters, and that larger depth of cut is possible in out-facing.

As seen in FIGS. 3-5 and 7, a distance from at least a portion of the fourth cutting edge 61 to the reference plane RP is increasing at increasing distance from the nose cutting edge 10. A distance from at least a portion of the third convex cutting edge 60 to the reference plane RP is decreasing at increasing distance from the nose cutting edge 10. In a side view as seen in FIGS. 3-5 and 7, the lowest point of the third and fourth cutting edges 60, 61 is the transition point 20, or a point within 1.00 from the transition point 20. The distance from the first cutting edge 11 to the reference plane RP is decreasing at increasing distance from the nose cutting edge 10.

As seen in e.g. FIG. 2, the top surface 8 comprises a protrusion 30. The protrusion 30 comprises a chip breaker wall 34 facing the forth cutting edge 61. The chip breaker wall 34 is arranged between an upper border line 21 and a lower border line 22. A distance between the upper and lower border lines 21, 22 is decreasing away from the nose cutting edge 10, where said distance is measured in a top view perpendicular to the fourth cutting edge 61. Said upper and lower border lines 21, 22 are preferably straight or substantially straight in a top view. In a top view, as seen in FIG. 2, the upper and lower border lines 21, 22 form an angle γ which is in the range of 3-15°, preferably 6-10°.

The top surface of the protrusion 30 is flat and parallel to the reference plane RP. The protrusion 30 is the part of the top surface 8 of the turning insert 1 which are located at the greatest distance from the reference plane RP.

In a top view, as seen in FIG. 2, a distance from the fourth cutting edge 61 to the upper border line 21 of the first chip breaker wall 34 is decreasing away from the nose cutting edge 10.

Figure 5:
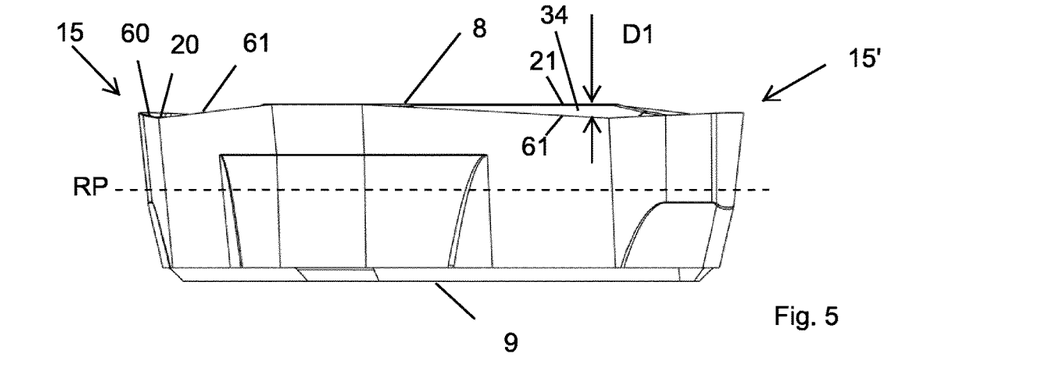
FIG. 5 is a further side view of the turning insert in FIG. 1, where the right-hand side fourth cutting edge extends in a plane perpendicular to the view.

As seen in e.g. FIG. 5, a distance D1 between the upper border line 21 and the forth cutting edge 61 is decreasing away from the nose cutting edge 10, where said distance D1 is measured in a plane perpendicular to the reference plane RP and perpendicular to the fourth cutting edge 61. Said upper border line 21 preferably extend in a plane which is parallel to the reference plane. Said distance D1 decreases from a maximum value of 0.3-0.5 mm to a minimum value of 0.0-0.1 mm.

The turning insert 1 comprises a nose portion 15 and an opposite second nose portion 15'. In other words, the turning insert comprises two opposite and identical, or substantially identical, nose portions 15, 15' formed 180° relative each other around the center axis A1 of the turning insert 1. Thus, in a top view as seen in FIG. 2, the turning insert 1 is 180° symmetrical. The first, second and fourth cutting edges 11, 12, 61 are linear or straight or substantially linear or straight. The nose portion 15 is symmetrical in relation to the bisector 7. Further, as seen in FIG. 2, the radius of curvature of the third cutting edge 60 is greater than the radius of curvature of the nose cutting edge 10.

Figure 7:
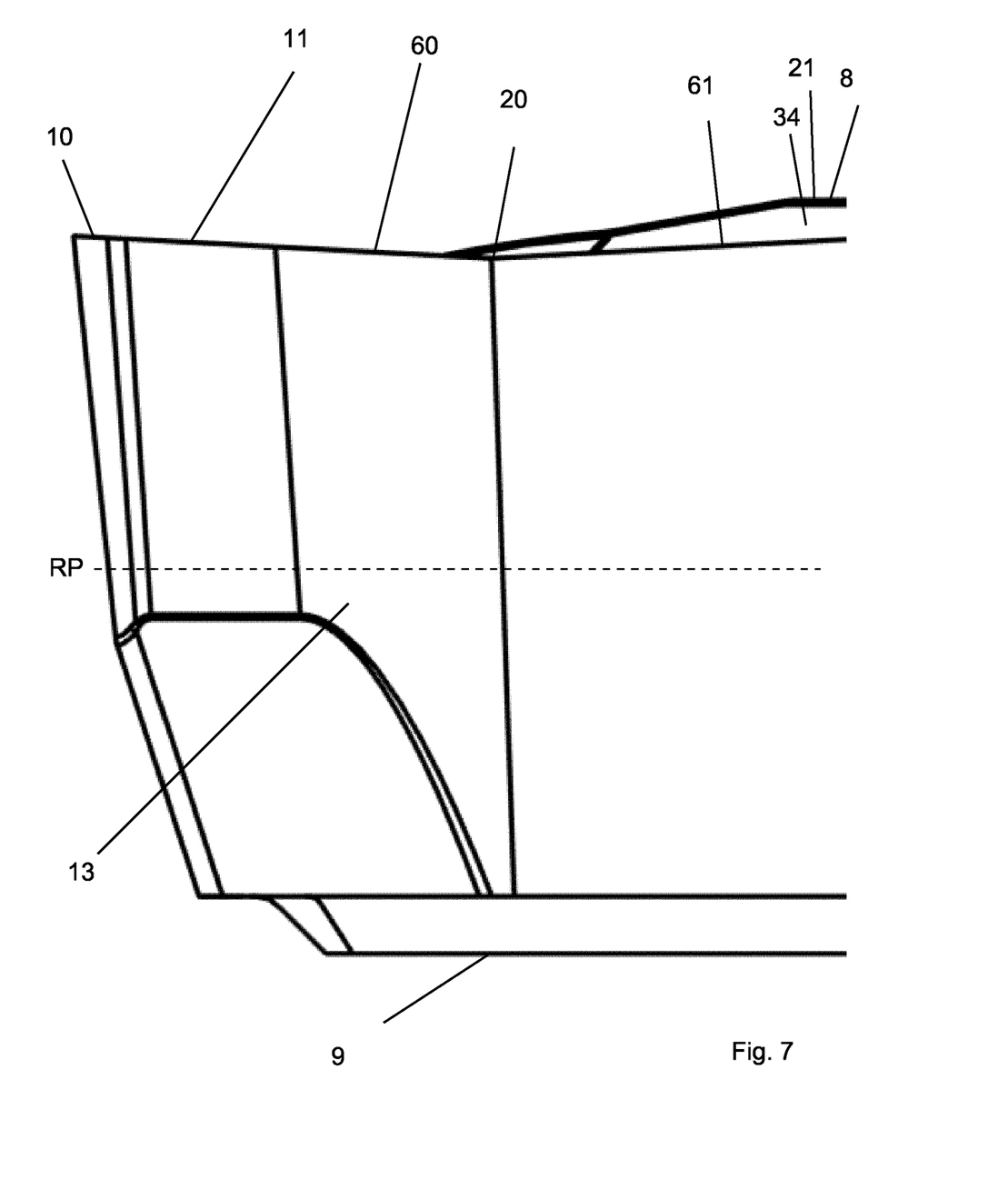
FIG. 7 is an enlarged view of the left-hand side nose portion in FIG. 5.

In a side view, such as in seen in FIG. 7, the fourth cutting edge 61 slopes upwards, such that the fourth cutting edge 61 has the lowest point thereof closer to the nose cutting edge 10. In other words, the distance from the fourth cutting edge 61 to the reference plane RP varies in such a way that that this distance is increasing at increasing distance from the nose cutting edge 10.

Further, the first, second and third cutting edges 10, 11, 60 are in a side view sloping downwards, i.e. in an opposite direction compared to the fourth cutting edge 61, such that in relation to the bottom surface 9, the nose cutting edge 10 is further away than the first and second cutting edges 11, 12, which in turn are further away than the third cutting edges 60. In this context, that a cutting edge is further away than another cutting edge refers to the respective mid-points of said cutting edges.

Bisectors 7 extend equidistantly from each pair of first 11 and second 12 cutting edges. Each bisector 7 intersects the center axis A1, and the bisectors 7 extend in a common direction.

Figure 6:
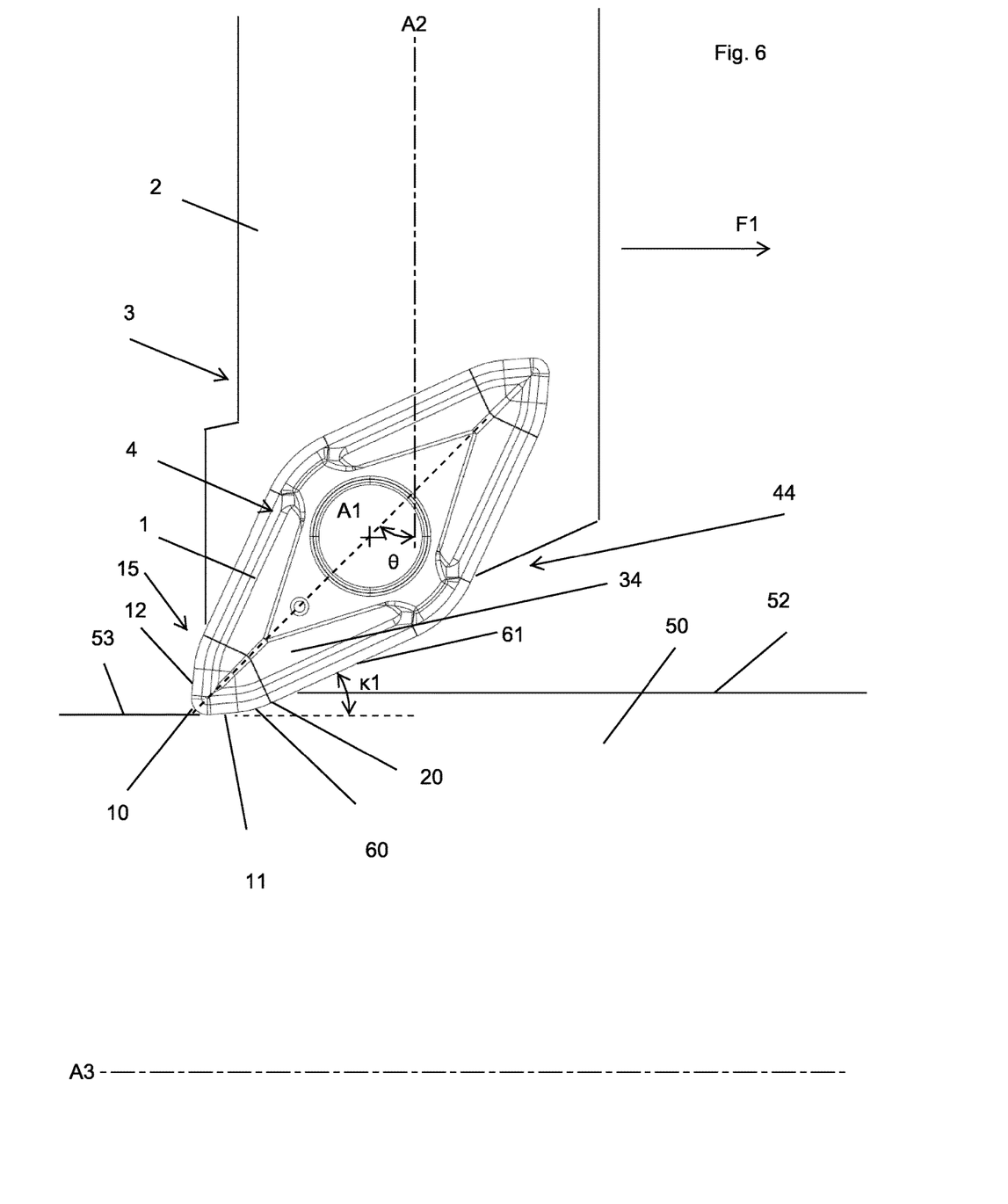
FIG. 6 is a schematic view showing a turning method using a turning tool comprising the turning insert in FIG. 1.

In FIG. 6, it is shown a turning tool 3 comprising the turning insert 1 according to the first embodiment and a tool body 2. The tool body is made from steel. The tool body 2 comprising a front end 44 and an opposite rear end (not shown). A main extension of the tool body 2 is along a longitudinal axis A2 extending from the front end 44 to the rear end. An insert seat 4 is formed in the front end 44. The turning insert 1 is mounted or mountable in the insert seat 4 such that in a top view, as shown in FIG. 6, the distance from the forth cutting edge 61 of an active nose portion 15 to the longitudinal axis A2 of the tool body is shorter than the distance from the second cutting edge 12 of an active nose portion 15 to the longitudinal axis A2 of the tool body. As seen in FIG. 6, one nose portion 15, located closer to the rotational axis A3 than the opposite inactive nose portion 15', is active. Active means that the nose portion as placed such that it can be used for cutting chips from the metal work piece 50.

The bisector 7 of the active nose portion 15 forms an angle θ in the range of 40-50° relative to the longitudinal axis A2.

The distance from the forth cutting edge 61 of the active nose portion 15 to the longitudinal axis A2 of the tool body is shorter than the distance from the second cutting edge 12 of the same active nose portion 15 to the longitudinal axis A2 of the tool body.

The turning insert 1, seen in top view, is securely and removably clamped in the insert seat 4 or pocket in the tool body 2 by means of a screw (not shown), having a center axis thereof which coincide or substantially coincide with the center axis A1 of the turning insert 1.

The tool body 2 is may at least partly be in the form of a square shank, which in cross section, in a plane perpendicular to the longitudinal axis A2, is square shaped. The sides of the square may have a length of e.g. 25 mm. Alternatively, the tool body may be rectangular in cross section. Alternatively, the tool body may be configured in any other suitable shape where the shape in different cross sections vary. The longitudinal axis A2 is located at the center of such cross section. The tool body may have a shape comprising e.g. a substantially conical or substantially frustoconical or tapered rear part suitable to be clamped in a tool spindle in a CNC-machine. In such case, the longitudinal axis A2 is located at the center of such cone. For example, the rear part of the tool body may be shaped in accordance to ISO 26623, or in any other way which is known in the industry under the name of "CAPTO".

In FIG. 6, a method to generate a cylindrical surface 53 on a metal work piece 50 is shown, by means of the turning tool 3. The metal work piece 50 rotates around a rotational axis A3. The first cutting edge 11 of the active nose portion 15 is positioned such that the first cutting edge 11 forms a smaller angle relative to the rotational axis A3 of the metal work piece 50 than the angle formed by the second cutting edge 12 relative to the rotational axis A3 of the metal work piece 50. The longitudinal axis A2 of the tool body 2 is positioned at a constant angle, which is perpendicular to the rotational axis A3 of the metal work piece 50. The turning insert 1 is moved in a direction F1 parallel to the rotational axis A3 such that the first cutting edge is active and is ahead of the surface generating nose cutting edge 10 in the direction of movement of the turning insert 1. The fourth cutting edge 61 is active at a entering angle κ1 of 10-45°, such that the lowest point of the third and fourth cutting edges 60, 61 is active, and such that a cylindrical surface 53 is formed. The transition point 20 is active, as seen in FIG. 6.

The nose cutting edge 10 is positioned a greater distance from the longitudinal axis A2 of the tool body 2 than all other parts of the turning tool 3. By such an arrangement, the turning tool 3 can be used for turning in a further feed direction, which is perpendicular to and away from the rotational axis 3, without reorientation of the longitudinal axis A2 in relation to the rotational axis A3.

The cutting depth is defined by the difference, in distance from the rotational axis A3, between the cylindrical surface 53 and the surface 52. The surface 52 is the surface of the metal work piece 50 which is to be machined by the turning tool 3 in the turning method. The surface 52 may be cylindrical or substantially cylindrical, resulting in a cutting depth which is constant or substantially constant. Alternatively, the surface 52 may have a distance to the rotational axis 52 which varies along the rotational axis, resulting in a cutting depth which varies during the method.

The feed direction F1, towards the right in FIG. 6, is parallel to the rotational axis A3 and preferably away from an end of the metal work piece 50 which is clamped to the CNC-lathe. The metal work piece 50 is preferably clamped by clamping jaws (not shown, which are pressed against an external surface of the metal work piece 50 at one first end, towards the left-hand side in FIG. 6. An opposite second end of the metal work piece 50, towards the right-hand side in FIG. 6, is preferably a free end.

In said feed direction, the fourth cutting edge 61 is active at an entering angle κ1 of 10-45°, preferably 20-40°, which in FIG. 6 is 30°. The fourth cutting edge 61 is the main cutting edge in said feed direction F1, i.e. the majority of the chips are cut by the fourth cutting edge 61, at least at moderate to high depth of cut. To a lesser degree, third cutting edge 60, the first cutting edge 11 and the nose cutting edge 10 are also active. The first cutting edge 11 is ahead of the nose cutting edge 10 in said feed direction F1. All parts of the turning insert are ahead of the active nose cutting edge 10 in said feed direction F1. The second cutting edge 11, formed on the active nose portion 15, is inactive.

In the axial turning i.e. longitudinal turning method shown in FIG. 6, chips are curled and/or directed by both the first, third and fourth cutting edges 11, 60, 61 as well as the chip breaker wall 34 and are may e.g. be broken by contact with the chip itself. Alternatively, and especially if the work piece material is a long chipping material and/or has low chip-breaking properties, the chip may break against the machined surface 53.

The cylindrical surface 53, or rational symmetrical surface, generated or formed at least partly by the nose cutting edge in FIG. 6, has a wavy shape with small peaks and valleys, and the wavy shape is influenced at least partly by the curvature of the nose radius and the feed rate. The wave height is less than 0.10 mm, preferably less than 0.05 mm. A thread profile is not a cylindrical surface 53 in this sense.

The work piece material 50 shown in FIG. 6 is preferably from either of the following groups: a) steel having a Carbon content of maximum 0.20 wt. %, b) Titanium, or c) heat resistant super alloy having a Nickel content of at least 40 wt. %.

Figure 8:
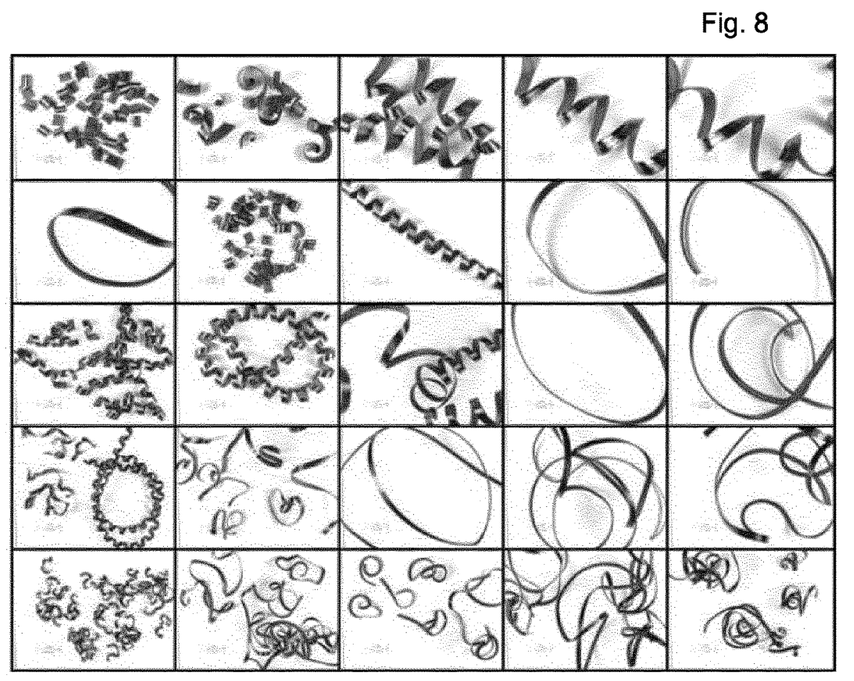
FIG. 8 is a chip chart from turning using a known turning insert
Figure 9:
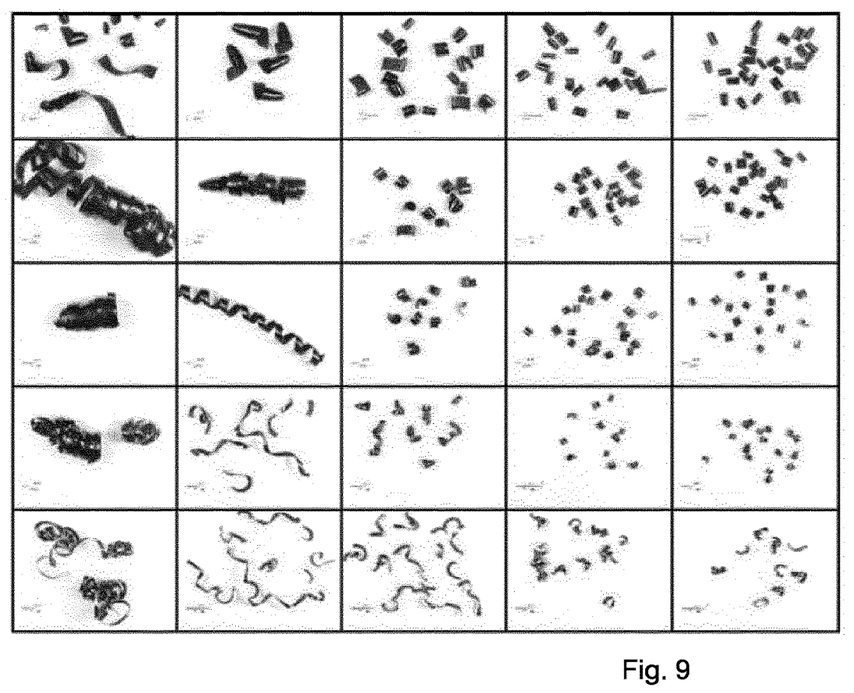
FIG. 9 is a chip chart from turning using the turning insert according to the first embodiment All turning insert figures have been drawn to scale.

Attention is now drawn to FIGS. 8 and 9. The only differences between FIG. 8 and FIG. 9 is that the shape of the chips are different, and that FIG. 8 is a chip chart from the turning insert according to EP3153261A1 (FIGS. 11a-e), while FIG. 9 is a chip chart from the turning insert according to the first embodiment. Both inserts have a distance in a top view between opposite nose cutting edges which is in the range of 24-26 mm. The chip charts are from turning as shown in FIG. 6. The axis are as follows: the x-axis shown feed rates; from left to right 0.3; 0.5; 0.7; 1.0 and 1.2 mm/rev. The y-axis show cutting depth; from bottom to top 0.5; 1.0; 2.0; 3.0 and 4.0 mm. The work piece material is a low-carbon steel designated S355J2 according to the standard EN 10025-2:2004. As can be seen from the chip charts, the chips from the turning insert according to the first embodiment (FIG. 9) is an improvement (shorter chips) over the known turning insert (FIG. 8), especially at feed rates within the range of 0.55-1.2 mm/rev., and especially at cutting depths within the range of 0.5-4.0 mm.

The turning method shown in FIG. 6 is preferably performed using a computerized numerical control (CNC) lathe, where the movement of the tool body 2 and the rotation of the metal work piece 50 is controlled by the computerized numerical control (CNC) lathe. The CNC-lathe execute instructions from a computer program. In other words, said computer program has instructions which when executed by a computer numerical control (CNC) lathe cause the computer numerical control (CNC) lathe to perform the method as described above and/or as shown in FIG. 6. The computer program may be stored on a computer readable medium. Alternatively, a data stream may be representative of the computer program.

Reference is now made to a turning insert according to a second embodiment (not shown). The turning insert according to the second embodiment is double sided, or usable in an upside-down position, in such a way that the top and bottom surface 8, 9 are identical. The area of the top and bottom surfaces 8, 9 are equal in size. The turning insert is mirror-symmetric in relation to the reference plane. The side surfaces of the turning insert extend along lines parallel to the center axis of the turning insert. In all other aspects, the turning insert according to the second embodiment is identical to, or substantially similar to, the turning insert according to the first embodiment.

Reference is now made to a turning insert according to a third embodiment. The turning insert according to the third embodiment comprises three nose portions. Said turning insert is 120° symmetrical. In other words, in a top view, the turning insert is identical or substantially identical if rotated around the center axis by 120° or by 240°. In other aspects, the insert according to the third embodiment is in accordance with the turning insert according to the first embodiment.

For all embodiments, the nose angle α, which is the angle between the first and second cutting edges 11, 12, is 75-85°, the angle β is 10-20°, and the radius of curvature in a top view of the nose cutting edge 10 is smaller than the radius of curvature of the third cutting edge. The transitions between all cutting edges are smooth, without sharp corners. By having a relatively large nose angle α, the strength of the nose cutting edge 10 is increased resulting in less wear. By having a relatively large nose angle α, the entering angle for the first cutting edge 11 is relatively small, 2.5-7.5°, which gives reduced wear of the first cutting edge. By having a relatively small radius of curvature of the nose cutting edge 10, a small radius on the component can be machined, and the turning insert 1 can be used to machine a wider range of shapes.

The invention is not limited to the embodiments disclosed, but may be varied and modified within the scope of the following claims. Words such as top, bottom etc. shall be interpreted as understood by the skilled person. The expression top view shall be understood as the view as seen in FIG. 2.

The invention claimed is:

1. A turning insert comprising:
a top surface;
an opposite bottom surface, wherein a reference plane is located parallel to and between the top surface and the bottom surface, and wherein a center axis extends perpendicular to the reference plane;
a side surface connecting the top surface and the bottom surface; and
a nose portion having a convex nose cutting edge, a first cutting edge and a second cutting edge, wherein the nose cutting edge connects the first and second cutting edges, wherein as seen in a top view the first and second cutting edges form a nose angle of 71-85° relative to each other, and wherein a bisector extends equidistantly from the first and second cutting edges, the nose portion including a third convex cutting edge adjacent to the first cutting edge and a fourth cutting edge adjacent to the third convex cutting edge, wherein as seen in the top view the fourth cutting edge forms an angle of 10-30° relative to the bisector, the third convex cutting edge and the fourth cutting edge being connected by a transition point, and wherein a distance from at least a portion of the fourth cutting edge to the reference plane is increasing as a distance from the nose cutting edge is increasing.

2. The turning insert according to claim 1, wherein a distance from at least a portion of the third convex cutting edge to the reference plane is decreasing as a distance of at least the portion of the third convex cutting edge from the nose cutting edge is increasing.

3. The turning insert according to claim 1, wherein, as seen in a side view, a lowest point of the third and fourth cutting edges is the transition point or a point within 1.00 mm from the transition point.

4. The turning insert according to claim 1, wherein the top surface includes a protrusion, in that the protrusion having a chip breaker wall facing the forth cutting edge, and wherein the chip breaker wall is arranged between an upper border line and a lower border line of the turning insert.

5. The turning insert according to claim 4, wherein a distance between the upper and lower border lines is decreasing as a distance away from the nose cutting edge is increasing, said distance between the upper and lower border lines being measured in a top view perpendicular to the fourth cutting edge.

6. The turning insert according to claim 4, wherein a distance between the upper border line and the fourth cutting edge is decreasing as a distance away from the nose cutting edge is increasing, said distance between the upper border line and the fourth cutting edge being measured in a plane perpendicular to the reference plane and perpendicular to the fourth cutting edge.

7. The turning insert according to claim 1, wherein a distance from the first cutting edge to the reference plane is decreasing as a distance from the nose cutting edge is increasing.

8. The turning insert according to claim 1, further comprising a second nose portion, wherein, as seen in the top view, the turning insert is 120° or 180° symmetrical or substantially 120° or 180° symmetrical.

9. The turning insert according to claim 1, wherein the nose portion is symmetrical or substantially symmetrical in relation to the bisector.

10. The turning insert according to claim 1, wherein, as seen in the top view, the first, second and fourth cutting edges are linear or straight, or substantially linear or straight.

11. The turning insert according to claim 1, wherein, as seen in the top view, the radius of curvature of the third cutting edge is greater than the radius of curvature of the nose cutting edge.

12. A turning tool comprising:
a turning insert according to claim 1; and
a tool body, the tool body including a front end, an opposite rear end, a main extension along a longitudinal axis extending from the front end to the rear end, an insert seat formed in the front end in which the turning insert is mountable such that as seen in a top view a distance from the forth cutting edge of an active nose portion to the longitudinal axis of the tool body is shorter than a distance from the second cutting edge of an active nose portion to the longitudinal axis of the tool body, the bisector of the active nose portion forming an angle of 40-50° relative to the longitudinal axis.

13. A method to generate a cylindrical surface on a metal work piece with a turning tool according to claim 1, comprising the steps of:
rotating the metal work piece around a rotational axis;
positioning the first cutting edge of an active nose portion such that the first cutting edge forms a smaller angle relative to the rotational axis of the metal work piece than an angle formed by the second cutting edge relative to the rotational axis of the metal work piece;
positioning the longitudinal axis of the tool body perpendicular to a rotational axis of the metal work piece; and
moving the turning insert in a direction parallel to the rotational axis such that the first cutting edge is active and is ahead of the surface generating nose cutting edge in the direction of movement of the turning insert, such that the fourth cutting edge is active at a entering angle of 10-45°, such that the lowest point of the third and fourth cutting edges is active, and such that a cylindrical surface is formed.

14. The method according to claim 13, further comprising the step of positioning the nose cutting edge a greater distance from the longitudinal axis of the tool body than of all other parts of the turning tool.

15. The method according to claim 13, further comprising the step of selecting the work piece material from either of the following groups:
- a) steel having a Carbon content of maximum 0.20 wt. %,
- b) Titanium, or
- c) heat resistant super alloy having a Nickel content of at least 40 wt. %.

16. The method according to claim 13, further comprising the step of providing a computerized numerical control lathe, wherein the movement of the tool body and the rotation of the metal work piece is controlled by the computerized numerical control lathe.

17. A computer program having instructions, which when executed by a computer numerical control lathe causes the computer numerical control lathe to perform the method according to claim 16.

\* \* \* \* \*